United States Patent
Gunkel et al.

(10) Patent No.: US 9,404,508 B2
(45) Date of Patent: Aug. 2, 2016

(54) SUCTION HOUSING

(75) Inventors: Rolf Gunkel, Friedrichshafen (DE); Johannes Hiry, Tettnang (DE); Jörg Andre Reitz, Salem (DE)

(73) Assignee: MTU FRIEDRICHSHAFEN GMBH, Friedrichshafen (DE)

(*) Notice: Subject to any disclaimer, the term of this patent is extended or adjusted under 35 U.S.C. 154(b) by 1071 days.

(21) Appl. No.: 13/508,453

(22) PCT Filed: Nov. 4, 2010

(86) PCT No.: PCT/EP2010/006729
§ 371 (c)(1),
(2), (4) Date: Jun. 26, 2012

(87) PCT Pub. No.: WO2011/054520
PCT Pub. Date: May 12, 2011

(65) Prior Publication Data
US 2012/0260889 A1  Oct. 18, 2012

(30) Foreign Application Priority Data
Nov. 6, 2009  (DE) .................... 10 2009 052 163

(51) Int. Cl.
F02B 33/44 (2006.01)
F02B 33/00 (2006.01)
(Continued)

(52) U.S. Cl.
CPC .......... F04D 29/4206 (2013.01); F02B 37/007 (2013.01); F05B 2220/40 (2013.01); Y02T 10/144 (2013.01)

(58) Field of Classification Search
CPC .... F02B 37/007; F02B 37/001; F02B 37/004; F02B 37/013; F04D 29/4206; F01D 25/24; F05D 2250/51

USPC ............ 60/612, 605.1; 23/562; 415/98, 205, 415/206
See application file for complete search history.

(56) References Cited

U.S. PATENT DOCUMENTS 2,359,615 A * 10/1944 Browne et al. .................. 60/612
3,457,869 A *  7/1969 Janetz ............................ 415/98
(Continued)

FOREIGN PATENT DOCUMENTS

DE 2154726 A1 5/1973
DE 3908286 C1 2/1990
(Continued)

OTHER PUBLICATIONS

Machine generated translation of DE 38 38 264 A1, published on May 17, 1990.*

*Primary Examiner* — Thai Ba Trieu
*Assistant Examiner* — Ngoc T Nguyen
(74) *Attorney, Agent, or Firm* — Reising Ethington, P.C.

(57) ABSTRACT

The invention relates to a suction housing (1) for an internal combustion engine, especially for arranging between a first (2) and a second (3) compressor of an internal combustion engine, characterized in that the suction housing (1) comprises an inner space (8) defined by a bottom element (9), a first (10) and a second (11) opposing lateral wall elements projecting from the bottom element (9), and a first (12) and a second (13) opposing front wall elements projecting from the bottom element. An open end (14) having an inlet (14a) via which charge air can enter the inner space (8) of the suction housing (1) is formed opposite the bottom element (9), and a web element (17) projecting from the bottom element (9) and arranged between the first (10) and the second (11) lateral wall elements is located in the inner chamber, said web element interconnecting the first (12) and the second (13) front wall elements. The first lateral wall element (10) has a first outlet (15) and the second lateral wall element (11) has a second outlet (16) for respective flow towards a compressor inlet (2b, 3b).

21 Claims, 4 Drawing Sheets

(51) Int. Cl.
 F04D 29/42 (2006.01)
 F02B 37/007 (2006.01)

(56) References Cited

U.S. PATENT DOCUMENTS

| | | |
|---|---|---|
| 5,142,867 A | 9/1992 | Bergmann et al. |
| 5,440,881 A | 8/1995 | Sudmanns et al. |
| 6,205,787 B1 * | 3/2001 | Woollenweber et al. ....... 60/612 |
| 6,378,309 B1 | 4/2002 | Divecha et al. |
| 2005/0172629 A1 | 8/2005 | Baumann |
| 2005/0188696 A1 | 9/2005 | Herz et al. |

FOREIGN PATENT DOCUMENTS

| | | | |
|---|---|---|---|
| DE | 3838264 A1 | 5/1990 | |
| DE | 19809854 A1 | 8/1999 | |
| DE | 102004004490 A1 | 8/2005 | |
| EP | 1382816 A2 * | 1/2004 | ............ F02B 37/007 |
| FR | 2109411 A5 | 5/1972 | |
| WO | WO-2004013472 A1 | 2/2004 | |

* cited by examiner

SUCTION HOUSING

CROSS-REFERENCE TO RELATED APPLICATIONS

This application claims priority to German Patent Application 10 2009 052 163.1 filed on Nov. 6, 2009 and PCT/EP2010/006729 filed on Nov. 4, 2010, which are hereby incorporated by reference in their entireties.

TECHNICAL FIELD

The present disclosure concerns a suction housing.

BACKGROUND

For combustion engines or motors, occasionally several charger groups or turbo charger groups are provided. In particular, it is known with diesel motors in V-design with two-step charging by means of turbo chargers (e.g., low-pressure and high-pressure chargers) to provide one cylinder bank for each charger group, while one charger group generally comprises several turbo chargers, e.g., for multi-step compression. In a package-optimal configuration, the air inlets of the first compressor steps are therein mostly arranged exactly opposite from each other, while the compressors can rotate in the same or opposite direction.

A compressor of the first charger group of the first cylinder bank and a compressor of the second charger group of the second cylinder bank must aspire the charge air (coming from the air filter) in such a way that no reciprocal influence and no shifting of the stabilization of compressor characteristics takes place because of the 90-degree deflection, e.g., in consequence of thrust or flow separation upstream from the compressor.

In order to supply both compressors with charge air, the charge air must be deflected very sharply in the known configurations, which often leads to a significant worsening of the stabilization of compressor characteristics. A deflection is achieved, for example, by means of Y-pipes, which are arranged between the compressors. In this kind of solution the induction pipe branches off, e.g., to two compressors. What is disadvantageous therein is especially the considerable assembly space, which is required for the large induction radius.

On this basis, the present disclosure has the purpose of proposing a suction housing, which overcomes the aforementioned disadvantages, and which can be embodied by a charger arrangement that saves significant space, or which can achieve a narrower package dimensioning within the combustion engine.

SUMMARY

According to the disclosure, a suction housing for a combustion engine is proposed, in particular for arrangement between a first and a second compressor of a combustion engine, wherein the suction housing has an internal space, which comprises a floor element, a first and second side wall element that are located opposite from each other and protrude from the floor element, as well as a first and second front wall element that are located opposite from each other and protrude from the floor element, while an open end with an inlet opening for the inflow of charge air into the internal space of the suction housing is provided opposite from the floor element, wherein a bar element is formed in the internal space that is arranged between the first and second side wall element and protrudes from the floor element while connecting the first and the second front wall element with each other, and wherein respectively the first side wall element has a first outlet opening and the second side wall element has a second outlet opening for inflow into a compressor inlet.

In an embodiment of the suction housing, the bar element protrudes essentially vertically from the floor element.

In an additional embodiment of the suction housing, the first and the second side wall element as well as the first and second front wall element protrude essentially vertically from the floor element.

Furthermore, a suction housing is proposed wherein the bar element connects the first and second front wall element in such a way that a profile is formed from the first and second front wall element as well as the bar element, which essentially has an H-shape, in particular an H-shape with a bar arranged centered between the first and second flank of the H-shape.

According to another embodiment of the suction housing, the floor element has a rib element, which protrudes from the floor element in the direction toward the internal space and which is arranged transversely, in particular vertically, to the bar element.

In an embodiment of the suction housing, the first outlet opening of the first side wall element is arranged opposite from the second outlet opening of the second side wall element. At this the first and second outlet opening can have identical outlet cross-sections.

Furthermore, in an additional embodiment, the first and second outlet openings have the same distance to the floor element and/or a front wall element and/or the bar element.

A suction housing is also proposed wherein the floor element in connection with the first and second front wall element essentially forms a U-shape in the cross-section.

Furthermore, a suction housing is proposed wherein the first and/or second outlet opening in the direction from the floor to the inlet opening is formed above the rib element.

In an embodiment of the suction housing, the first and/or second side wall element in the area of the first and second outlet opening in the direction of the outlet have a funnel shape or a funnel shaped cross-section.

Furthermore, a suction housing is proposed wherein the bar element divides the internal space of the suction housing into two chambers, in particular such that they are identical in volume.

In another embodiment of the suction housing, the suction housing has a fastening element on the open end.

In yet another embodiment of the suction housing, the side wall element has a fastening device on an outside wall that is arranged opposite from the inside wall, in particular for fastening a bellows.

Also proposed is a combustion engine with a first and second compressor, wherein a suction housing is arranged between the first and second compressor.

In another embodiment of the combustion engine, the first compressor is arranged with a compressor inlet on the first outlet opening and/or the second compressor with a compressor inlet on the second outlet opening.

In yet another embodiment of the combustion engine, a bellows is arranged between a compressor and the suction housing.

Additional characteristics and advantages are shown in the following description of exemplifying embodiments, by means of the figures and drawings and in the Claims. The individual characteristics can each be embodied by themselves or in several optional combinations.

Preferred embodiments of the invention are explained in more detail in the following by means of the enclosed drawings.

DETAILED DESCRIPTION

In the following description and in the drawings, identical reference characters refer to elements of same or comparable function.

Figure 1:
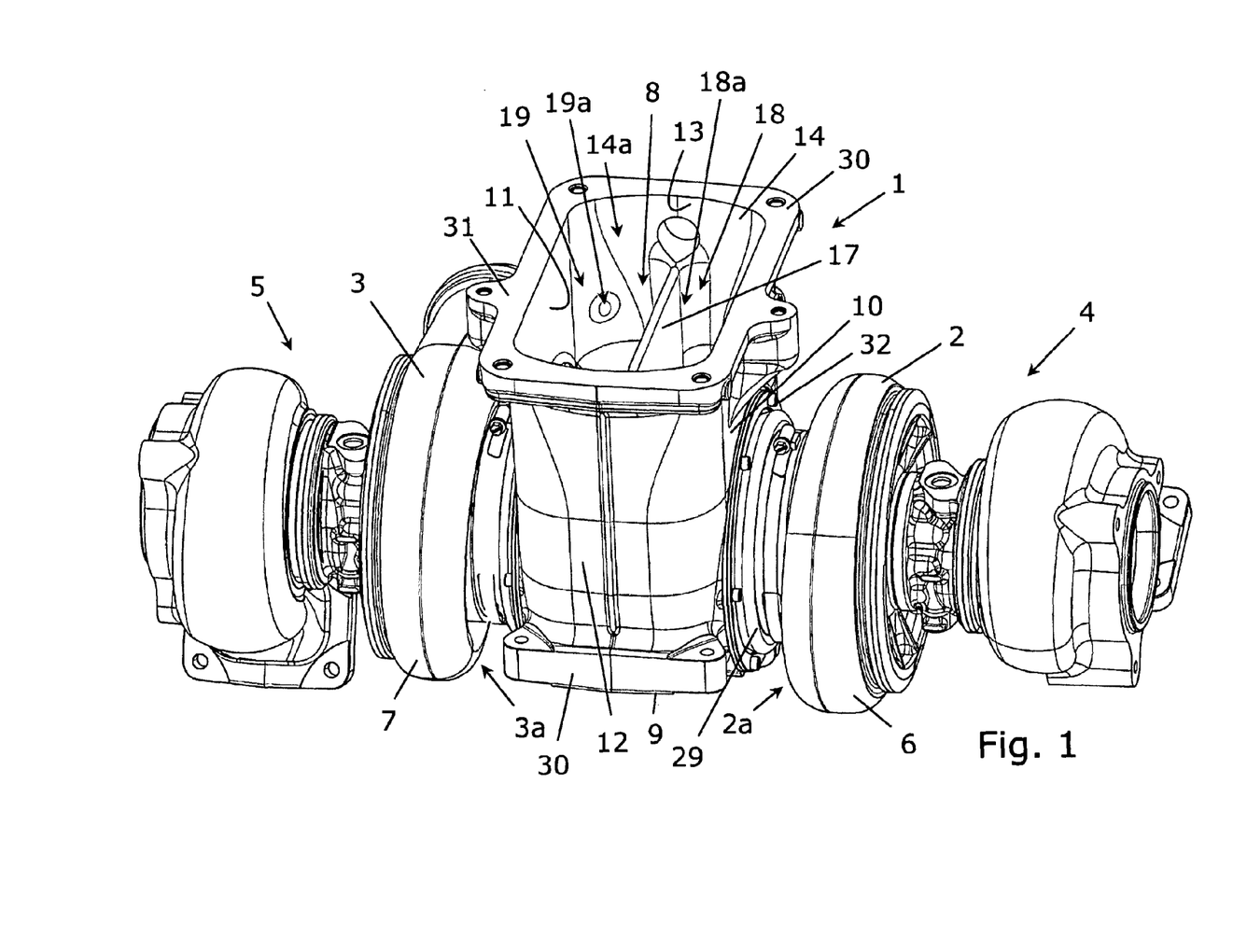
FIG. 1 shows a possible embodiment of a suction housing that is arranged between two compressors.
Figure 2:
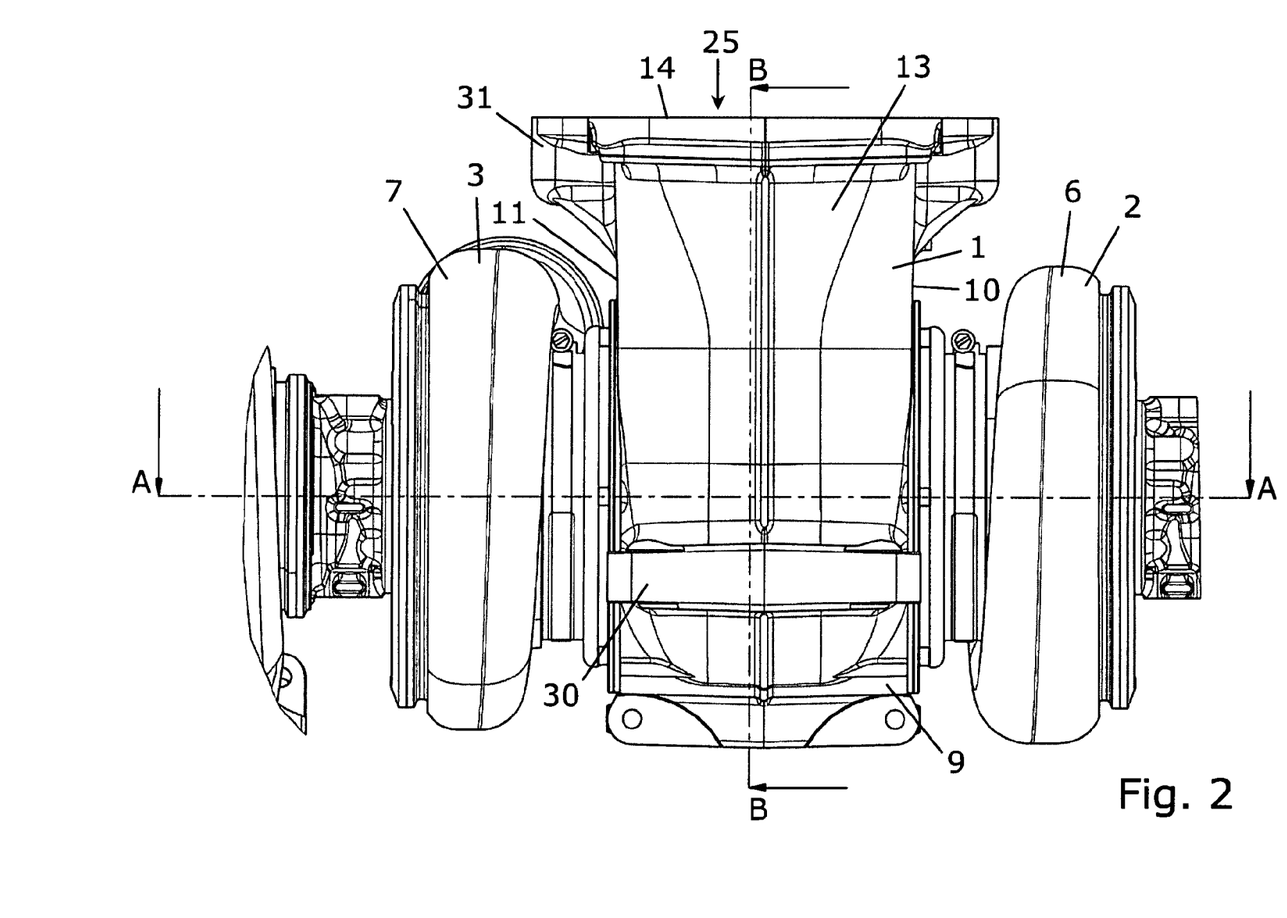
FIG. 2 shows a possible embodiment of the suction housing that is arranged between two compressors according to FIG. 1.

FIG. 1 shows a suction housing 1, which is arranged between a first compressor 2 and a second compressor 3. The first 2 compressor is, for example, the compressor of a first turbo charger 4, the second 3 compressor is, for example, a compressor of a second turbo charger 5, wherein the first 4 and second 5 turbo charger are, for example, exhaust gas turbo chargers in a combustion engine, or alternatively, e.g., mechanical chargers, e.g., drive chargers. The compressors 2, 3 can be provided for implementation of a multi-step charging wherein the air is compressed through several compressors that are connected in series. The compressors 2, 3 can therein be according to known method, e.g., each a compressor of a first compression stage.

Figure 3:
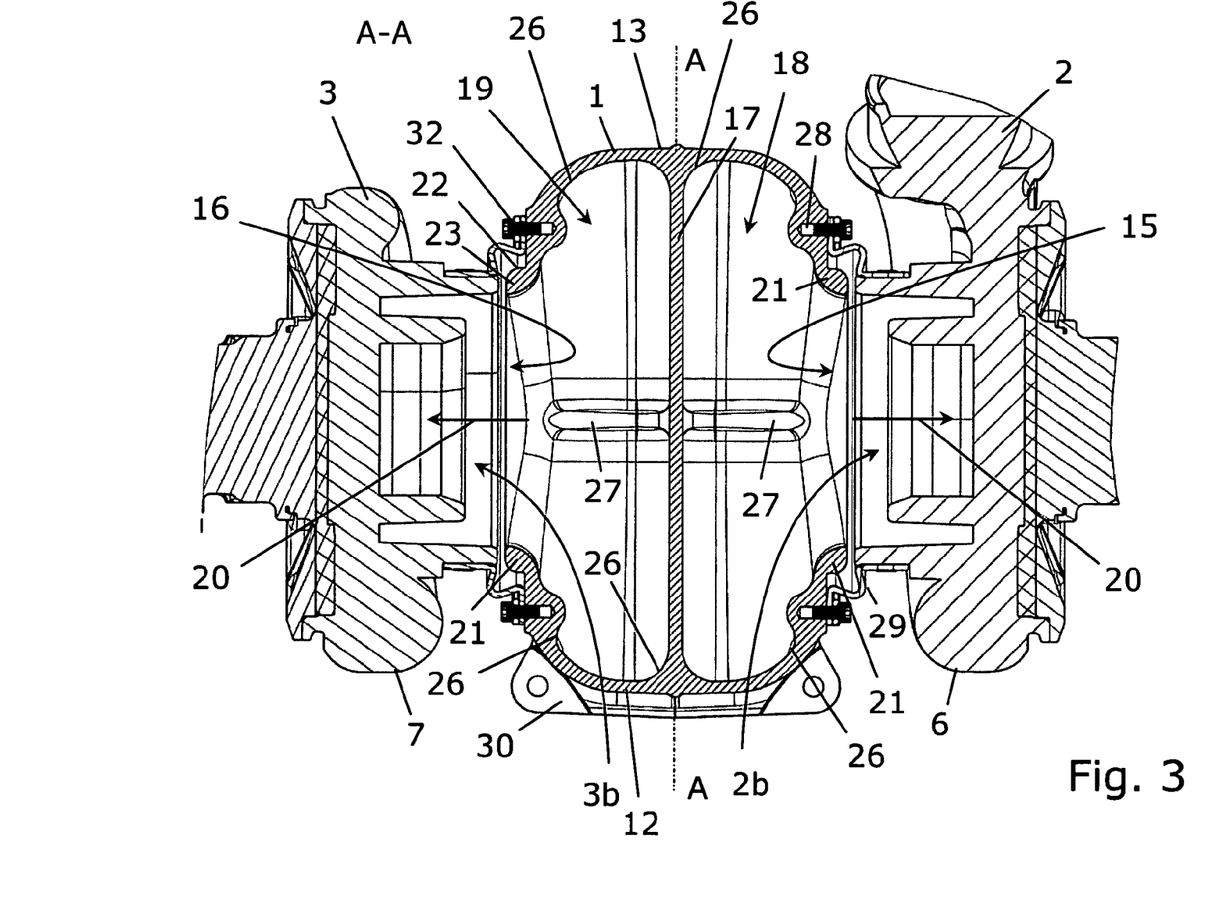
FIG. 3 shows a cross-section view as an example for the suction housing arranged between two compressors along the A-A line of FIG. 2.
Figure 4:
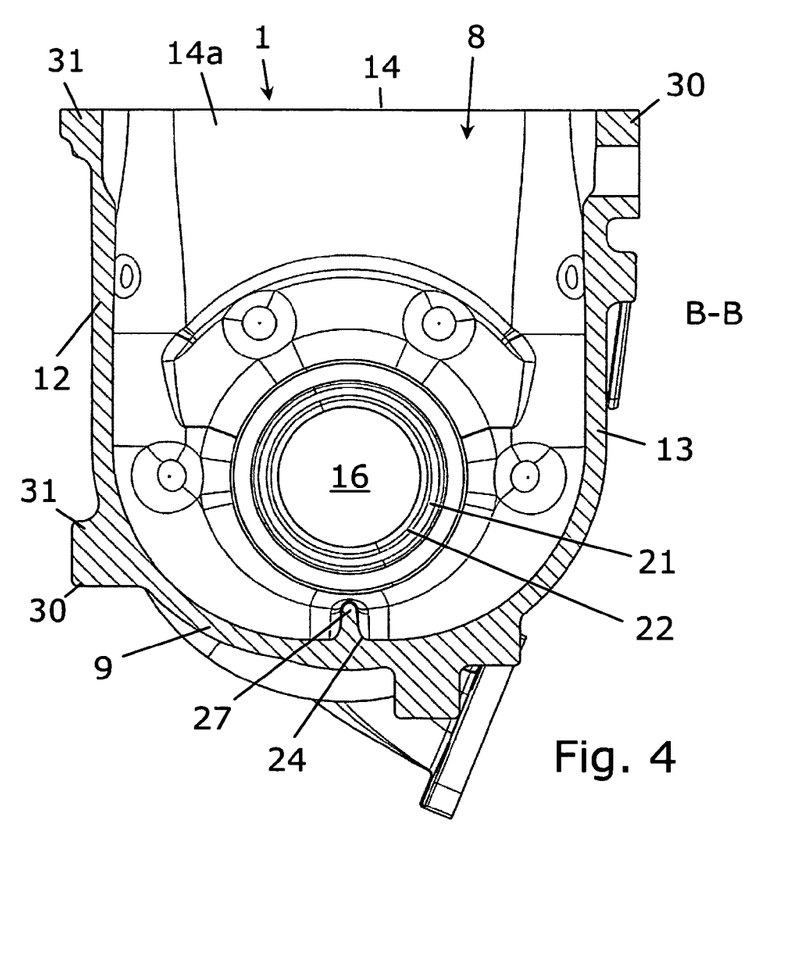
FIG. 4 shows a cross-section view as an example for the suction housing arranged between two compressors along the B-B line of FIG. 2.

The compressors 2, 3 each have, e.g., one compressor wheel (not shown), each of which is arranged in a compressor housing 6, 7 for rotation, and each of which is driven by a turbine wheel that is arranged in the exhaust gas flow of the turbo charger 4, 5 or in another known way. At this the compressor wheels in an arrangement upstream from the first 2 and second 3 compressor can turn, e.g., in same or opposite rotation direction. The compressors 2, 3, for example, each have an inlet side 2a, 3a with a compressor inlet or inlet opening 2b, 3b (FIG. 3) for charge air that is inflowing or, e.g., to be transported in the direction of the combustion chamber, and each also have an outlet side for discharge of the charge air. In the present configuration of the suction housing 1 between the first 2 and second 3 compressor, e.g., each inlet side 2a, 3a of the compressors 2, 3 is arranged adjacent to the suction housing 1.

The suction housing 1 comprises an internal space 8, which is embodied, e.g., as a hollow space. The internal space 8 is limited or closed by a floor element 9, in particular toward the bottom. The floor element 9, for example, has an essentially square profile, e.g., with a vault or bulge in the direction of an exterior side of the suction housing 1. A first 10 and a second 11 wall element or side wall element protrude from the floor element 9, and they are arranged opposite from each other, e.g., each on one edge of the floor element 9 or lateral from it. The first 10 and the second 11 side wall element, for example, protrude vertically or essentially vertically from the floor element 9, and are each, for example, plate-shaped. The internal space 8 is provided between the first 10 and second 11 side wall element, e.g., in form of the hollow space.

Furthermore, the internal space 8 is enclosed or surrounded by a third and fourth wall element, or a first 12 and a second 13 front wall element, each of which protrudes likewise from the floor element 9 or extends in upward direction. The first 12 and a second 13 front wall elements are arranged opposite from each other on the floor element 9, e.g., each on one edge of the floor element 9 and, e.g., each connected with a first 10 and a second 11 side wall element, e.g., in a gas-resistant way, e.g., by means of an edge section. The front wall elements 12, 13, e.g., are also formed in plate-shape. The first 10 and second 11 side wall elements as well as the first 12 and a second 13 front wall elements enclose or extend around the internal space 8 and protrude, e.g., each vertically or essentially vertically from the floor element 9. They thereby form, e.g., an essentially square cross-section and are, e.g., integrally connected with the floor element 9.

One end of the suction housing 1 located opposite from the floor element 9 is, for example, embodied as an open end 14, which has an inlet opening 14a for a charge airflow, which, e.g., originates from a charge air cooler or, e.g., an air filter of a combustion engine. Through the inlet opening 14a, in particular during the combustion engine operation, e.g., charge air flows into the internal space 8 of the suction housing 1, thus from the open end 14 in the direction of the floor element 9. The charge air can for this purpose be led or carried into the internal space 8 through the inlet opening 14a, e.g., from an induction pipe, which, e.g., is installed with one end or, e.g., an adapter piece, on the open end 14.

The charge air is, for example, aspired by the first 2 and second 3 compressor, each of which is arranged on the suction housing 1 with their inlet side 2a, 3a, e.g., adjacent to it. In order for a compressor 2, 3 to be able to aspire the charge air through the suction housing 1, the suction housing 1 comprises, e.g., a first outlet opening 15, which, e.g., is provided in the first front wall element 10 and an additional, second outlet opening 16, which, e.g., is provided in the second side wall element 11. By means of the first 15 and second 16 outlet opening, a charge air flow from the open end 14 through the outlet openings 15, 16 to one of the compressors 2, 3 that are connected with them, or their inlet openings 2b, 3b can be designed, e.g., if the suction housing 1 is charged with underpressure from the respective compressor 2, 3 by means of the outlet openings 15, 16.

In the internal space 8 of the suction housing 1 a bar element 17 is provided, which, for example, protrudes from the floor element 9, e.g., vertically or essentially vertically from it. The bar element 17 is, for example, plate-shaped and embodies, for example, the function of a partition wall. The bar element 17 divides, for example, the internal space 8 into two chambers 18 and 19, in particular hollow chambers 18, 19, each of which are connected with an outlet opening 15 or 16 and the open end 14 in terms of flow, and e.g., have the same volume, e.g., each an internal space 18a, 19a. The bar element 17 connects the first 12 and the second 13 front wall element and is arranged between the first 10 and a second 11 front wall element, e.g., essentially in parallel and centered between the side wall elements 10, 11. The bar element 17 in this respect forms an H-shaped profile with the first 12 and second 13 front wall element, in particular with an H-bar and H-flanks that are aligned vertically to each other. At this the H-flank is arranged in particular centered between the H-flanks, wherein the H-bar lengths can exceed that of the H-flanks.

By means of the bar element 17, as mentioned above, two chambers 18, 19 are separated in the internal space 8 of the suction housing 1, in each of which a charge airflow can be created that is to greatest extent unaffected by the charge air flow of the other chamber 18, or, respectively 19. Thus a compressor 2, 3 arranged on the outside wall of the side wall element 10, 11 of the respective chamber 18, 19 does not exert interrupting influence on the respective compressor 3, 2 that are respectively arranged on the side wall element 11, 10 of the other chamber 19, 18.

In, e.g., the operation of the combustion engine, the charge air, as mentioned above, flows in from the open end 14 into the suction housing 1, wherein the charge airflow is divided by the bar element 17 or distributed to the chambers 18, 19 that are formed in the internal space 8. In order to allow for the charge air of the respective chambers 18, 19 or that of the respective internal space 18a, 19a to flow through the respective outlet opening 15, 16 into the designated compressor 2, 3, or in order to achieve a homogenous flow conduction, the internal space 8 of the suction housing 1, in particular in the area of the outlet openings 15, 16 or around the outlet openings 15, 16 is, e.g., designed for large volume.

For this purpose, e.g., a circular volume can be designed in the area of the outlet openings 15, 16, e.g., the first 10 and/or second 11 side wall element in the area of the respective outlet opening 15, 16 in the outlet direction 20 can have a funnel shape or a funnel-shaped profile 21, which, e.g., supports the flow conduction. The side wall element 10, 11 can for this purpose, e.g., have a bulge 22 around each of the outlet openings 15, 16 (toward the external side opposite from the internal space 8), e.g., a bulge 23 around each outlet opening 15, 16, or a large volume in another way that supports the flow, or which creates a circular volume. Thus the air can not only flow from the top or the inlet opening 14a into the compressor 2, 3. At this, a diameter of the outlet openings 15, 16 has, e.g., significantly smaller dimensions relative to a distance from the front wall elements 12, 13 (or the H-bar length).

In order to be able to create an airflow in the suction housing 1 that has, e.g., low spin or no spin, the internal space 8 or each hollow chamber 18, 19 can have, e.g., a profile tampered in the direction of the lower interior end 24 (FIG. 1), which can be formed by the floor element 9 or by the connection with the front wall elements 12, 13. For example, the first 12 and a second 13 front wall element can together with the floor element 9 enclose the internal space 8 in the cross section in a U-shape, wherein the bar of the U-shape arranged at the bottom can bulge to the bottom or into the inlet direction 25. This can be achieved, e.g., by a bulge of the floor element 9 into the inlet direction 25 (vault in the direction of the inlet).

Furthermore, one or several connecting points or joints 26 can also be provided in the internal space, each of which are to be rounded or designed in a bend shape, e.g., between a side wall element 10, 11 and a front wall element 12, 13, between a side wall element 10, 11 and a floor element 9, between a front wall element 12, 13 and the floor element 9, between the bar element 17 and a front wall element 12, 13, as well as between the bar element 17 and the floor element 9 (inside corners in cross-section) in order to avoid disrupting swirls in the charge airflow.

In order to reduce the spin of inflowing air or charge air, in particular, e.g., a backflow of charge air into the direction of the open end 14a, a rib element 27 can be arranged on the floor element 9, which protrudes from it in the direction of the internal space 8, counter to the inlet direction 25, and which thereby works, e.g., on the airflow, to prevent spin on the floor side. The rib element 27 is, for example, arranged vertically or transversely to the bar element 17 (e.g., offset by 90 degrees) and encompasses, e.g., only a fraction of its extent in the direction of the inlet opening 14a, e.g., up to slightly below the inlet openings 15, 16. The rib element 27 is, for example, arranged on both sides of the bar element 17, each on the floor element 9 or in each chamber 18, 19, e.g., centered between the first 12 and a second 13 front wall element and e.g., essentially parallel with each of these.

So that the airflow in the two chambers 18, 19 can be designed essentially identical, the first 15 and the second 16 outlet opening (in outlet direction) are opposite each other and/or have the same outlet cross-section. In particular, e.g., the first 15 and the second 16 outlet opening have the same distance from the floor element 9, and are arranged above the same, thus at equal height. It is furthermore intended that the first 15 and the second 16 outlet opening have the same distance from the respective front wall element 12, 13 and/or to the bar element 17. In this respect, the suction housing 1, for example, is symmetrical to a center axis A, which, e.g., runs through the bar element 17.

Around the compressors 2, 3, each of which is to be connected with an outlet opening 15, 16 of the suction housing 1, it is provided that one or one side wall element 10, 11 each has a fastening device 28, in particular on one of the external sides opposite from the internal space 8, by means of which, for example, a bellows 29 can be fastened to the side wall element 10, 11 around the outlet opening 15, 16 and so that the compressor inlet can be fastened permanently, e.g., permanently so that it cannot be loosened without destructive intervention.

So to be able to connect the suction housing 1 with additional components of the combustion engine, additionally provided are, for example, one or several fastening device(s) 30 on the open end 14 and/or a side or front wall element and/or the floor element 9, each of which allow for a permanent fastening, e.g., permanently so that it cannot be loosened without destructive intervention. The fastening device 30 can, e.g., be designed as a flange element 31, e.g., for screw connection with a corresponding flange element.

So to embody a combustion engine, e.g., a suction housing 1 is arranged between a first 2 and a second 3 compressor. At this the inlet opening 2b of the first compressor 2 is arranged, e.g., adjacent to the outlet opening 15 of the first side wall element 10 and the inlet opening 3b of the second compressor 3, e.g., adjacent to the outlet opening 16 of the second side wall element 11, in particular for a flow connection. The compressor 2, 3 can therein each be in a fixed connection with the suction housing 1, e.g., by means of a fastening device 28 of the suction housing 1. At this, common fastening methods can be used.

It is provided to arrange the compressor, e.g., by means of a bellows 29 on the suction housing 1, so that sealing is achieved by the bellows 29, as applies by using an additional seal, e.g., a ring seal, and so that, e.g., a simultaneous decoupling of the compressor 2, 3 from the suction housing 1, e.g., a vibration decoupling, is facilitated. A bellows 29 is, e.g., a tubular configuration that is variable in its longitudinal and/or cross extension in consequence of folding, and which can follow suit to the longitudinal and/or cross extension of the components that are connected by it. One end of the bellows 29 is arranged or fastened, e.g., around the compressor inlet or a compressor inlet opening 2b or 3b. The second end is, e.g., arranged around the outlet opening 15 or 16 to be connected for flow on the outside of the side wall element 10 or 11 and the suction housing 1, e.g., by means of the fastening device 28 and a corresponding fastening means 32 that is, e.g., arranged on the bellows.

The invention claimed is:
1. A suction housing of an internal combustion engine for arrangement between a first and a second compressor of the internal combustion engine, comprising:

a floor element, a first and a second side wall element that are opposite from each other and protrude from the floor element, and a first and a second front wall element that are opposite from each other and protrude from the floor element, the floor element, the first and second side wall elements, and the first and second front wall elements defining an internal space;

wherein an open end with an inlet opening for inflow of charge air into the internal space of the suction housing is provided opposite from the floor element;

wherein in the internal space comprises a bar element, which is arranged between the first and second side wall element and which protrudes from the floor element, while connecting the first and second front wall element;

wherein the first side wall element has a first outlet opening and the second side wall element has a second outlet opening each for inflow into a compressor inlet; and wherein the floor element has a rib element protruding in the direction of the internal space, the rib element extending in a direction transverse to the bar element.

2. The suction housing according to claim 1, wherein the bar element protrudes vertically from the floor element.

3. The suction housing according to claim 1, wherein the first and the second side wall element as well as the first and the second front wall element protrude vertically from the floor element.

4. The suction housing according to claim 1, wherein the bar element connects the first and the second front wall elements with each other so that a cross-section from the first and the second front wall element as well as the bar element form an H-shape, the bar element positioned between a first flank and a second flank of the H-shape.

5. The suction housing according to claim 1, wherein the rib element is arranged transversely, and vertically to the bar element.

6. The suction housing according to claim 1, wherein the first outlet opening of the first side wall element is arranged opposite from the second side wall element.

7. The suction housing according to claim 1, wherein the first and second outlet openings have the same outlet cross-section.

8. The suction housing according to claim 1, wherein the first and second outlet opening have the same distance from the floor element or from a front wall element or from the bar element.

9. The suction housing according to claim 1, wherein the floor element forms a connection in cross-section U-shaped with the first and second front wall element.

10. The suction housing according to claim 1, wherein the first and second outlet opening in the direction from the floor element to the inlet opening are arranged above the rib element.

11. The suction housing according to claim 1, wherein the first or second side wall element has a funnel-shaped cross-section in the area of the first or second outlet opening in an outlet direction, respectively.

12. The suction housing according to claim 1, wherein the bar element divides the internal space of the suction housing into two chambers.

13. The suction housing according to claim 1, wherein the open end of the suction housing is configured to be secured to an air intake of the internal combustion engine.

14. The suction housing according to claim 1, wherein one of the first and second side wall elements is configured to be secured to a bellows on an external side thereof, opposite from the internal space.

15. An internal combustion engine with a first and a second compressor, the engine comprising a suction housing according to claim 1, wherein the suction housing is arranged between the first and second compressors.

16. The internal combustion engine according to claim 15, wherein the first compressor with a compressor inlet is arranged on the first outlet opening or the second compressor with a compressor inlet is arranged on the second outlet opening.

17. The internal combustion engine according to claim 15, wherein a bellows is arranged between one of the first and second compressors and the suction housing.

18. A suction housing of an internal combustion engine for arrangement between a first and a second compressor of the internal combustion engine, comprising:

a floor element, a first and a second side wall element that are opposite from each other and protrude from the floor element, and a first and a second front wall element that are opposite from each other and protrude from the floor element, the floor element, the first and second side wall elements, and the first and second front wall elements defining an internal space;

wherein an open end with an inlet opening for inflow of charge air into the internal space of the suction housing is provided opposite from the floor element;

wherein in the internal space comprises a bar element, which is arranged between the first and second side wall element and which protrudes from the floor element, while connecting the first and second front wall element;

wherein the first side wall element has a first outlet opening and the second side wall element has a second outlet opening each for inflow into a compressor inlet;

wherein the floor element has a rib element protruding in the direction of the internal space, the rib element extending in a direction transverse to the bar element; and wherein at least one of the first and second side wall elements defines a cross-section narrowing in the direction of the respective outlet opening of the at least one of the first and second side wall elements.

19. The suction housing according to claim 18, wherein the cross-section of the at least one of the first and second side wall elements is funnel-shaped.

20. A suction housing of an internal combustion engine for arrangement between a first and a second compressor of the internal combustion engine, comprising:

a floor element, a first and a second side wall element that are opposite from each other and protrude from the floor element, and a first and a second front wall element that are opposite from each other and protrude from the floor element, the floor element, the first and second side wall elements, and the first and second front wall elements defining an internal space;

wherein an open end with an inlet opening for inflow of charge air into the internal space of the suction housing is provided opposite from the floor element;

wherein in the internal space comprises a bar element, which is arranged between the first and second side wall element and which protrudes from the floor element, while connecting the first and second front wall element;

wherein the first side wall element has a first outlet opening and the second side wall element has a second outlet opening each for inflow into a compressor inlet; and wherein each of the first and the second side wall element and the first and the second front wall elements vertically protrudes from the floor element.

21. The suction housing according to claim 20, wherein the floor element extends laterally, and said each of the first and the second side wall elements and the first and the second front wall elements is vertically arranged with respect to the laterally extended floor element.

\* \* \* \* \*